United States Patent
M et al.

(10) Patent No.: US 9,868,077 B2
(45) Date of Patent: Jan. 16, 2018

(54) METHOD AND APPARATUS FOR IN SITU CLEANING OF TUBE SETTLERS IN WATER CLARIFICATION

(71) Applicants: Hambley David M, Calgary (CA); Hambley Philip, Calgary (CA)

(72) Inventors: Hambley David M, Calgary (CA); Hambley Philip, Calgary (CA)

(*) Notice: Subject to any disclaimer, the term of this patent is extended or adjusted under 35 U.S.C. 154(b) by 436 days.

(21) Appl. No.: 14/511,881

(22) Filed: Oct. 10, 2014

(65) Prior Publication Data

US 2016/0101375 A1 Apr. 14, 2016

(51) Int. Cl.
| | |
|---|---|
| *B01D 21/02* | (2006.01) |
| *B01D 21/28* | (2006.01) |
| *B01D 21/00* | (2006.01) |
| *C02F 1/52* | (2006.01) |
| *C02F 1/00* | (2006.01) |

(52) U.S. Cl.
CPC ..... *B01D 21/0006* (2013.01); *B01D 21/0051* (2013.01); *B01D 21/28* (2013.01); *C02F 1/5281* (2013.01); *C02F 2001/007* (2013.01)

(58) Field of Classification Search
CPC ............ B01D 21/0006; B01D 21/0051; B01D 21/28; C02F 2001/007
USPC ........................................ 210/802, 521, 522
See application file for complete search history.

(56) References Cited

U.S. PATENT DOCUMENTS

| | | | | |
|---|---|---|---|---|
| 3,640,387 A * | 2/1972 | Conley | ............ | B01D 21/0006 210/521 |
| 3,975,276 A * | 8/1976 | Schmid | ............ | B01D 21/0051 210/521 |
| 4,045,344 A * | 8/1977 | Yokota | ............ | B01D 21/0006 210/521 |
| 4,136,012 A * | 1/1979 | Louboutin | ......... | B01D 21/0051 210/521 |
| 4,897,206 A * | 1/1990 | Castelli | ............ | B01D 21/0045 210/522 |
| 4,933,524 A * | 6/1990 | Meurer | ............ | B01D 21/0003 210/521 |
| 5,536,409 A * | 7/1996 | Dunkers | ............ | B01D 21/286 210/521 |
| 5,658,461 A * | 8/1997 | Marsh | ................ | B01D 21/0006 210/521 |
| 6,171,483 B1 * | 1/2001 | Eden | .................. | B01D 21/0051 210/521 |

* cited by examiner

*Primary Examiner* — Christopher Upton
(74) *Attorney, Agent, or Firm* — John Russell Uren

(57) ABSTRACT

Apparatus and method to remove sediment from tubes of a tube settler assembly used in water clarification. A series of tube laterals extends beneath the area of the tube settler assembly and allows air to escape from air exit holes in the tube laterals. An air supply provides air to the tube laterals. The air released from one tube lateral may be released by a second tube lateral at a time different from the time of air released by the first tube lateral. The air entrained in liquid rises and dislodges sediment in the tubes of the tube settler assembly. A flow deflector may be located below the structure supporting the tube settler assembly to deflect rising air into the tube settler assembly which would otherwise be blocked from air entry.

6 Claims, 14 Drawing Sheets

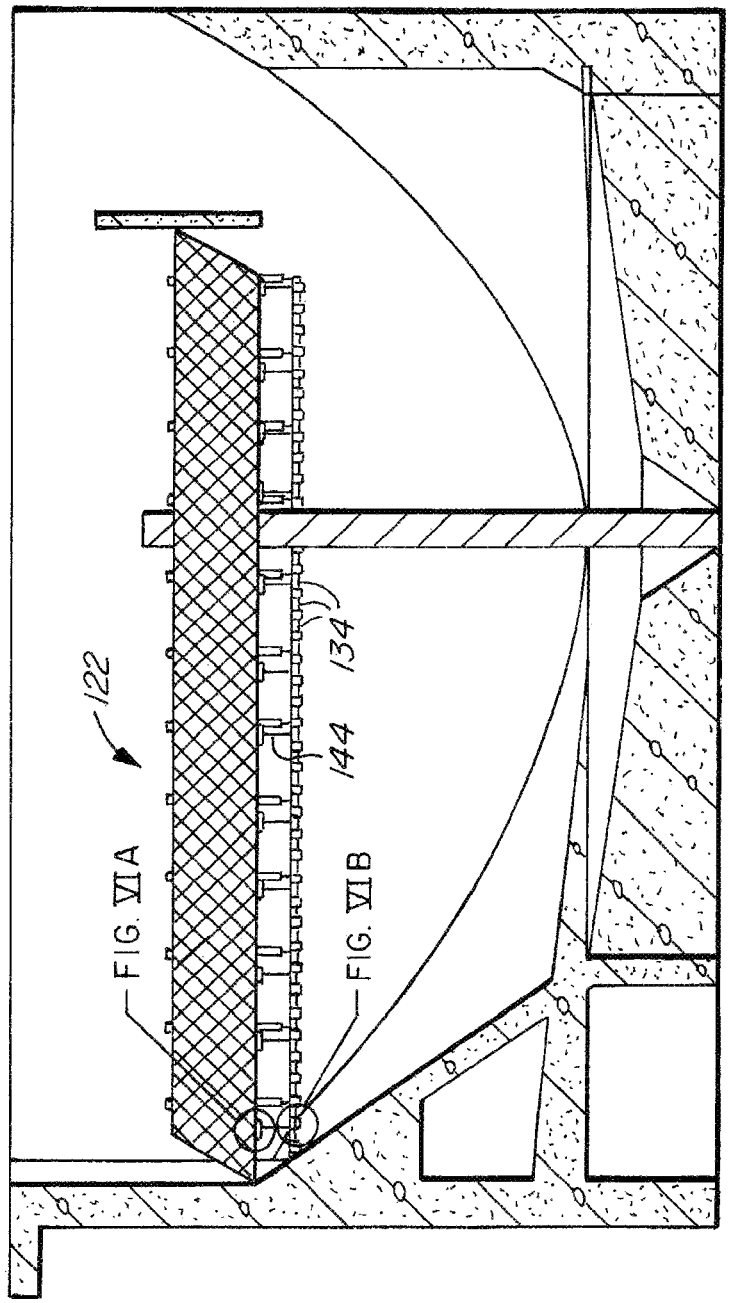

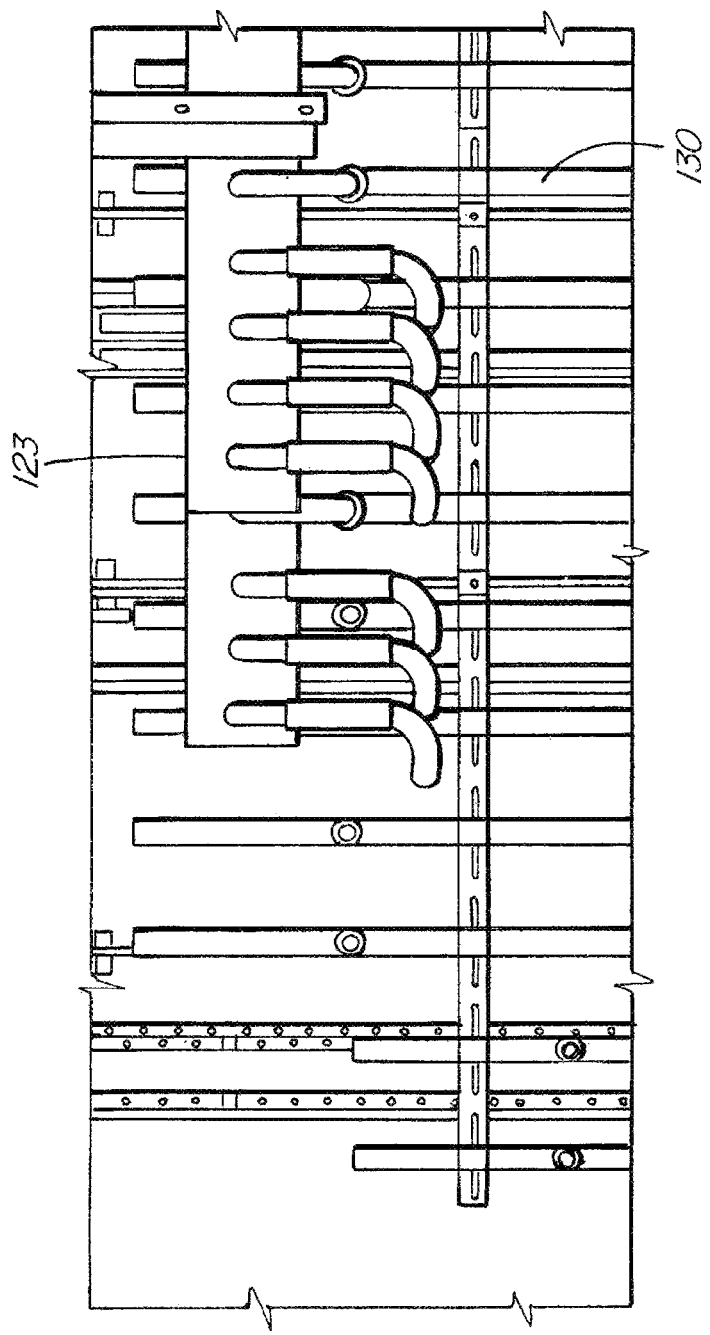

METHOD AND APPARATUS FOR IN SITU CLEANING OF TUBE SETTLERS IN WATER CLARIFICATION

INTRODUCTION

This invention relates to potable water purification and, more specifically, to a method and apparatus for cleaning tube settlers during a water clarification process.

BACKGROUND OF THE INVENTION

In our U.S. Pat. No. 6,797,166 issued Sep. 28, 2004, the contents of which are incorporated herein by reference, there is described and claimed a filter underdrain apparatus and a method of utilising such an apparatus during water filtration. The technique utilises certain improvements in underdrains which have worked well in water filtration. The present invention extends such improvements in water clarification and relates to improvements which take place upstream of the water filtration.

In water clarification, tube settlers which comprise a plurality of extended length tubes generally molded into a composite tube settler apparatus which is inserted into a water clarification cell. The water to be clarified runs through the tubes of the tube settler apparatus and deposits sediments and other solids in the tubes. The purpose of the tube settler apparatus is to increase the surface area exposed to the water such that the effective settling area is increased.

A problem with such tube settlers is that because of the solid deposition within the tubes, the tubes may become plugged. If the tubes become plugged, the performance and efficiency of the settlement process is adversely effected. In certain clarification procedures, the tube bundles can become so fouled with heavy sludge, collapse of the tube bundles and even the underlying support structure for the tube bundlers can occur. This is a costly and time consuming problem. Thus, intermittent cleaning of the tubes to remove the buildup of sludge over time is required.

One existing method of cleaning the tubes is by manually washing the tube bundles from above with a high pressure water stream directed at the tube bundles. While the tube bundles which are exposed to the water stream are cleaned in a satisfactory manner using this technique, the tube bundles that are not so exposed such as those beneath the collection troughs and walkways are not cleaned thereby detracting from the overall performance of the tube settler apparatus.

Another technique is colloquially called "air lancing" which instead of water, uses high pressure air which plays on the tube openings in the settler. The tube bundles are, however, sensitive to the high pressure air and damage to the tube settler assembly can occur. Similar to the manual washing technique, not all tube bundles can be reached with the high pressure air. Also likewise, the procedure is labor intensive.

A further technique used provides a fixed air distribution grid under the tube settler assembly. While this technique shows promise, existing air distribution grids do not reach a substantial portion of the tube bundle area and no air distribution into the tubes immediately above the support structure for the tube settler assembly is provided. Existing air grids, therefore, do not clean the tube settler assembly in these locations which is disadvantageous.

SUMMARY OF THE INVENTION

According to a first aspect of the invention, there is provided a method to dislodge sediment retained within individual tubes of a tube settler assembly used for water clarification, said method comprising entraining air released below said tube settler assembly with liquid and allowing said entrained air and liquid to move upwardly into said tube settler assembly and to dislodge sediment within said tubes of said tube settler assembly, said air and liquid entrainment taking place with air released from at least two adjacent tube laterals, said tube laterals being supplied with by an air supply, said air supply supplying air to a first of said two respective tube laterals independently of supplying said air to a second of said two respective tube laterals.

According to a further aspect of the invention there is provided apparatus to remove sediment retained with tubes of a tube settler assembly in a water clarification process, said apparatus comprising a tube settler assembly having a bottom area and a plurality of tubes, a plurality of tube laterals extending across substantially the entire bottom area of said tube settler assembly, air holes to emit air from said tube laterals, an air supply to provide air to said tube laterals, at least one of said tube laterals allowing air to exit from said air exit holes at a time different from air exiting from said air exist holes in a second of said tube laterals.

BRIEF DESCRIPTION OF THE SEVERAL VIEWS OF THE DRAWINGS

Specific embodiments of the invention will now be described, by way of example only, with the use of drawings in which:

FIG. 5 is a partial diagrammatic side view of the concrete clarifier cell according to FIG. 1B but particularly illustrating the tube settler assembly and the air supply ducts beneath the tube settler assembly which are used to supply cleaning air for the tube settler assembly;

FIG. 11 is a diagrammatic bottom enlarged view of the tube laterals and air pipes beneath the tube settler assembly;

DESCRIPTION OF SPECIFIC EMBODIMENT

Figure 1A:
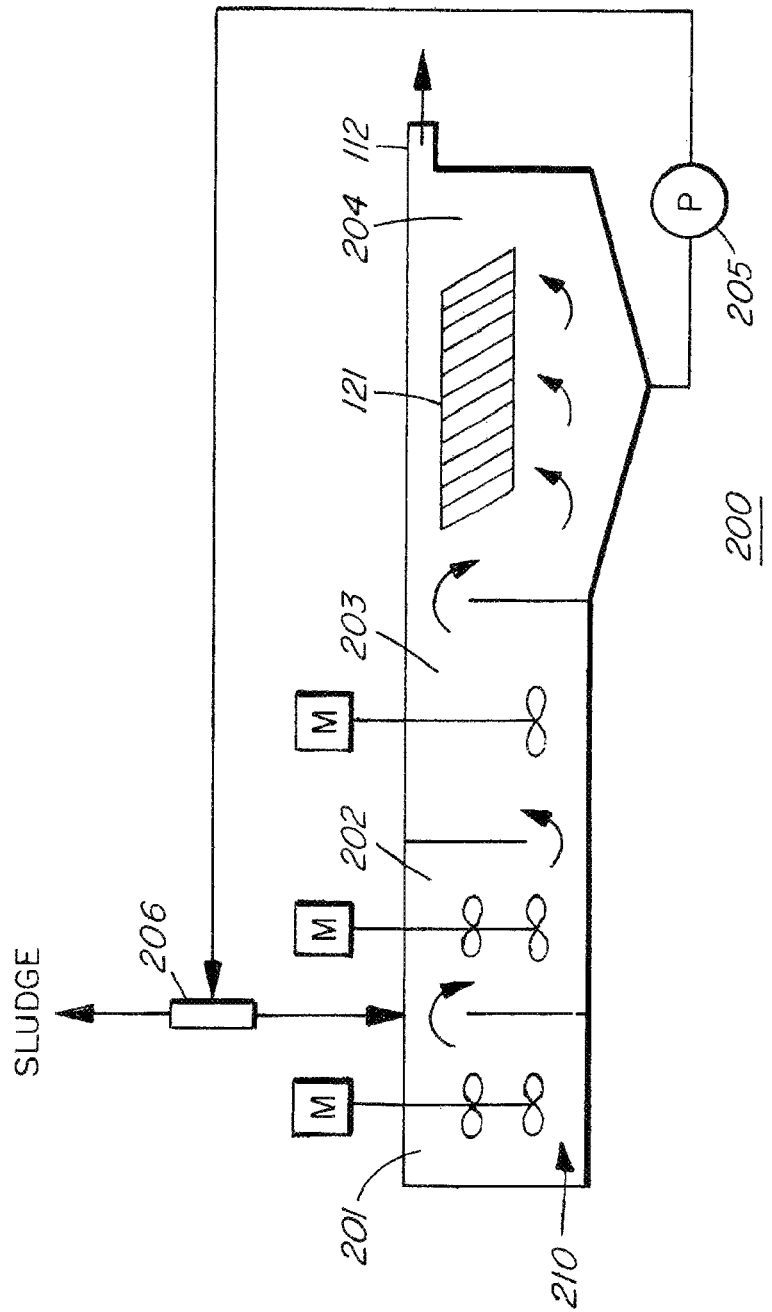
FIG. 1A is a diagrammatic side view of a raw water treatment process which includes the clarification step according to the invention.

Referring now to the drawings and, more particularly, to FIG. 1A, the water treatment process particularly in a high rate clarification application includes a clarification step according to the invention and is illustrated generally at 200. Three (3) basins, namely the coagulation basin 201, the injection basin 202 and the maturation basin 203 are illustrated in FIG. 1A. The lamella clarifier basin or concrete clarifier cell 204, which may be used in both high speed and conventional clarification procedures, is positioned downstream from the initial three basins 201, 202, 203. Its operation will be explained in greater detail hereafter.

Figure 14:
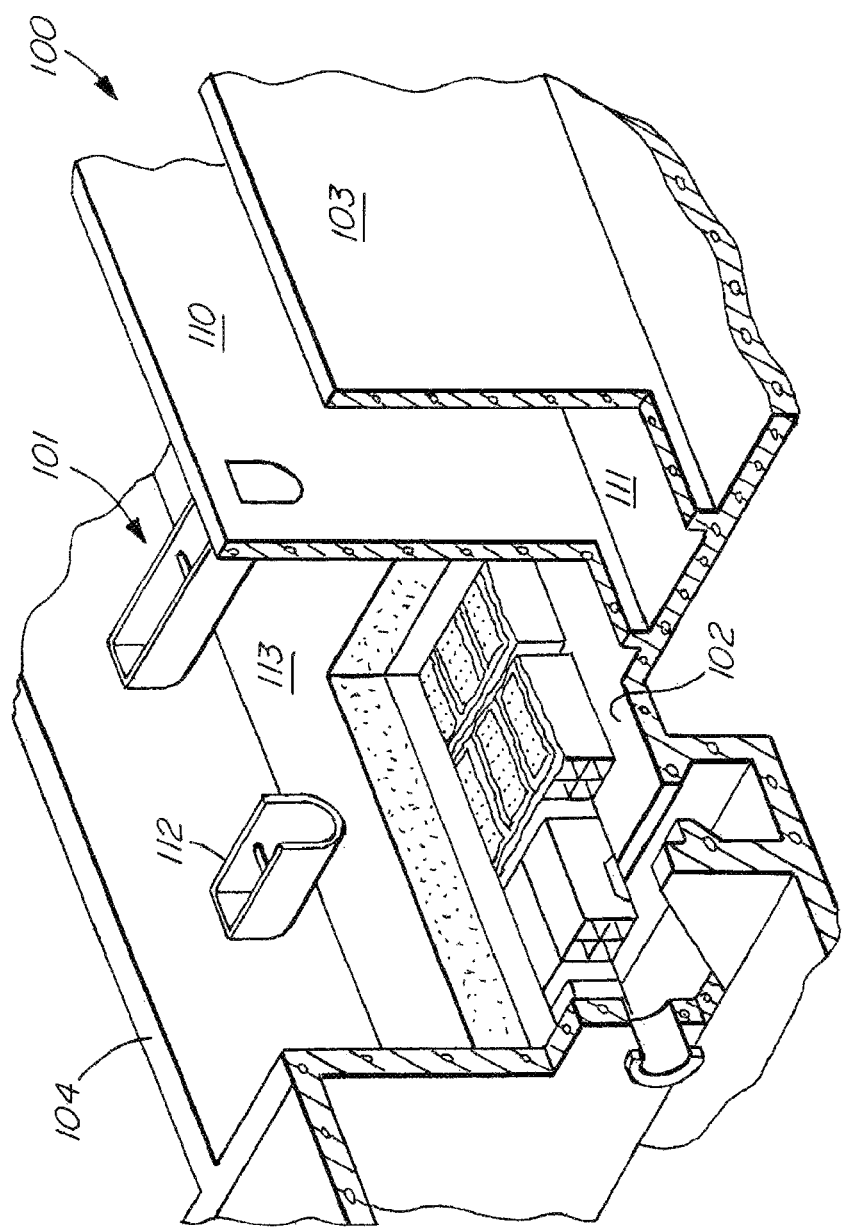
FIG. 14 is an isometric partially sectional view of a filter underdrain system located downstream from the concrete clarifier cell of FIG. 1B.

Raw water to be clarified and filtered enters the coagulation basin 201 from raw water trough or flume 210. A coagulant is introduced into coagulation basin 201 and with the mixer diagrammatically illustrated, the suspended solids are destabilised. The coagulated water then passes to the injection basin 202 where a polymer and microsand are typically added to the coagulated water. This water is passed to the maturation or flocculation basin 203 where it acquires a weight and volume. The flocculated water passes to the lamella clarifier basin 204 where the ballasted floc settles. The clarified water overflows to the filter assembly 100 in the concrete filtration basin 101 through troughs 112 (FIG. 14).

Figure 1B:
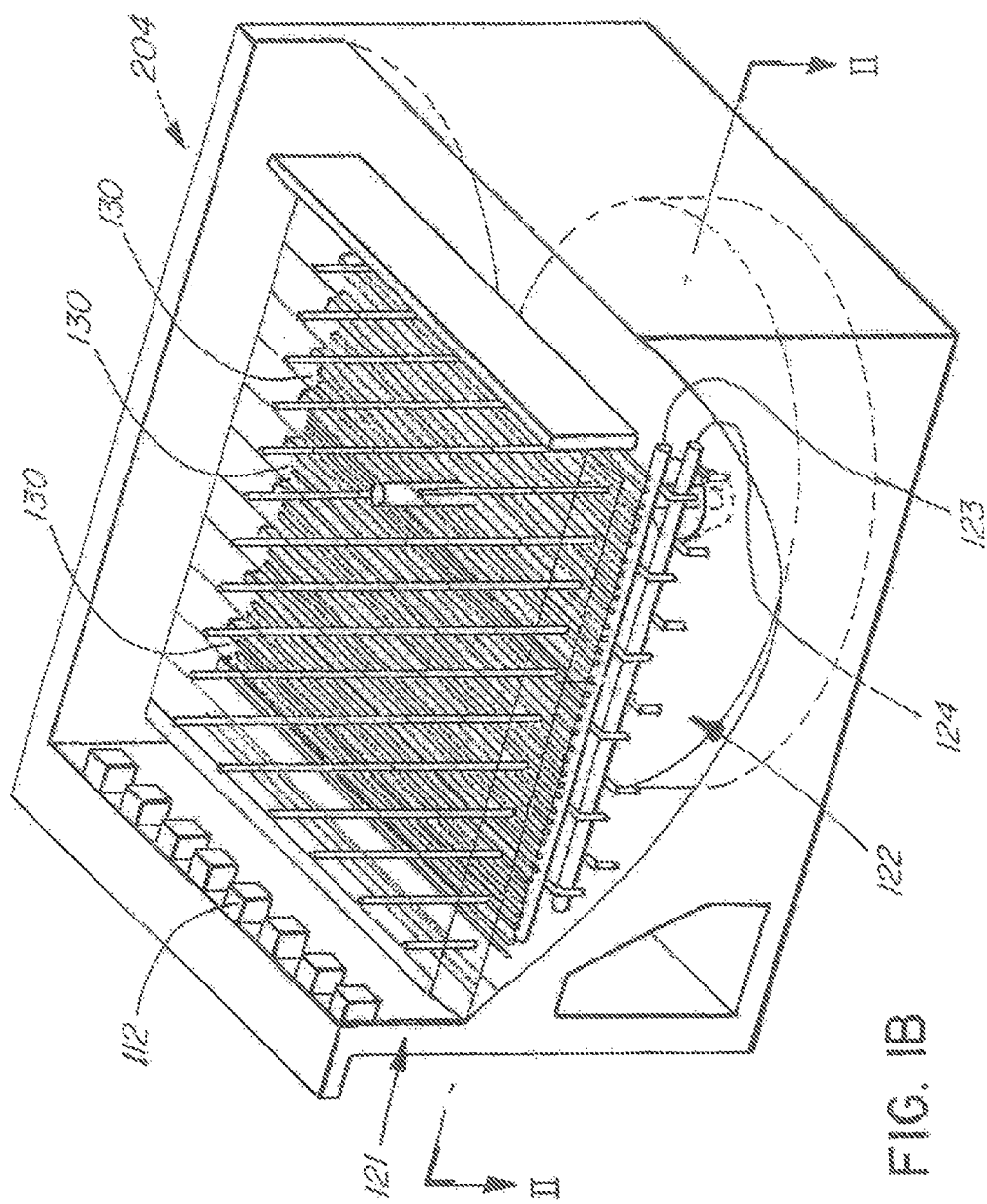
FIG. 1B is a diagrammatic isometric view of the concrete clarifier cell within which the ballasted clarification step occurs and wherein tube settlers and a backwash flow process to clean the tube settlers takes place according to the invention.
Figure 2:
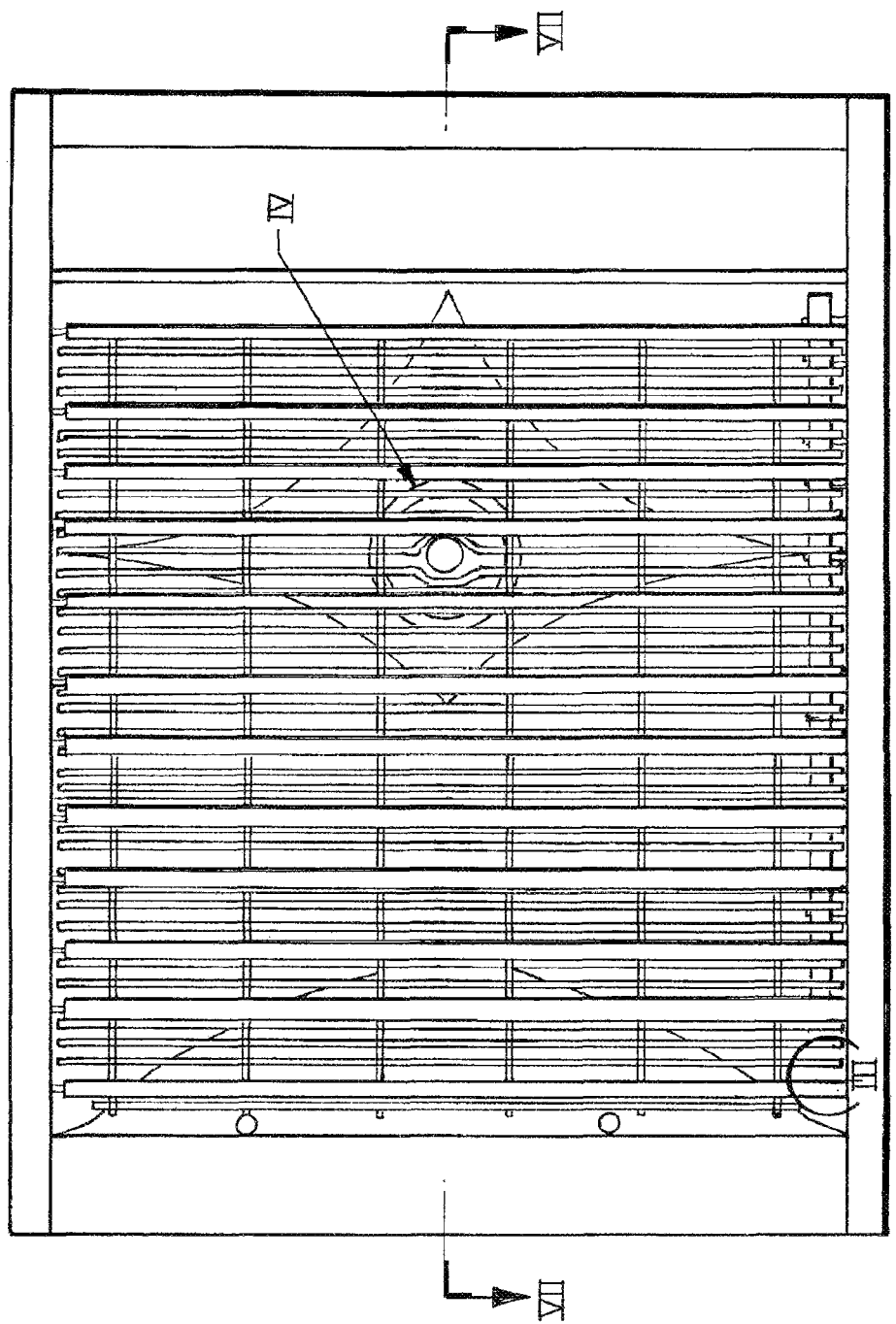
FIG. 2 is a diagrammatic plan view taken generally along the plane II-II of FIG. 1B.

The lamella clarifier basin or concrete clarifier cell 204 (FIGS. 1A and 1B). It uses the flocculated water which passes from troughs 112 extending from the maturation basin 203 (FIG. 1A). The flocculated water is introduced beneath the tube settler assembly generally illustrated at 121 (FIG. 12) and passes upwardly through the tube settlers generally illustrated at 122 where the ballasted floc within the water settles over time as more clearly seen in FIGS. 12 and 13. The clarified water passing through the tube settlers overflows from the tube settler assembly 121 into troughs 112 which pass the clarified water to the filter assembly generally illustrated at 100 in the concrete filter basin 101 (FIG. 14). The subsequent use of the filter assembly 100 where the clarified water from the tube settlement basin 120 flows into the filter assembly from troughs 112 from the lamella clarifier basin forms no part of the present invention and is disclosed for the purposes of a full explanation of the process. The filter assembly 100 is described more fully in our U.S. Pat. No. 6,797,166, the contents of which are incorporated herein by reference.

Figure 12:
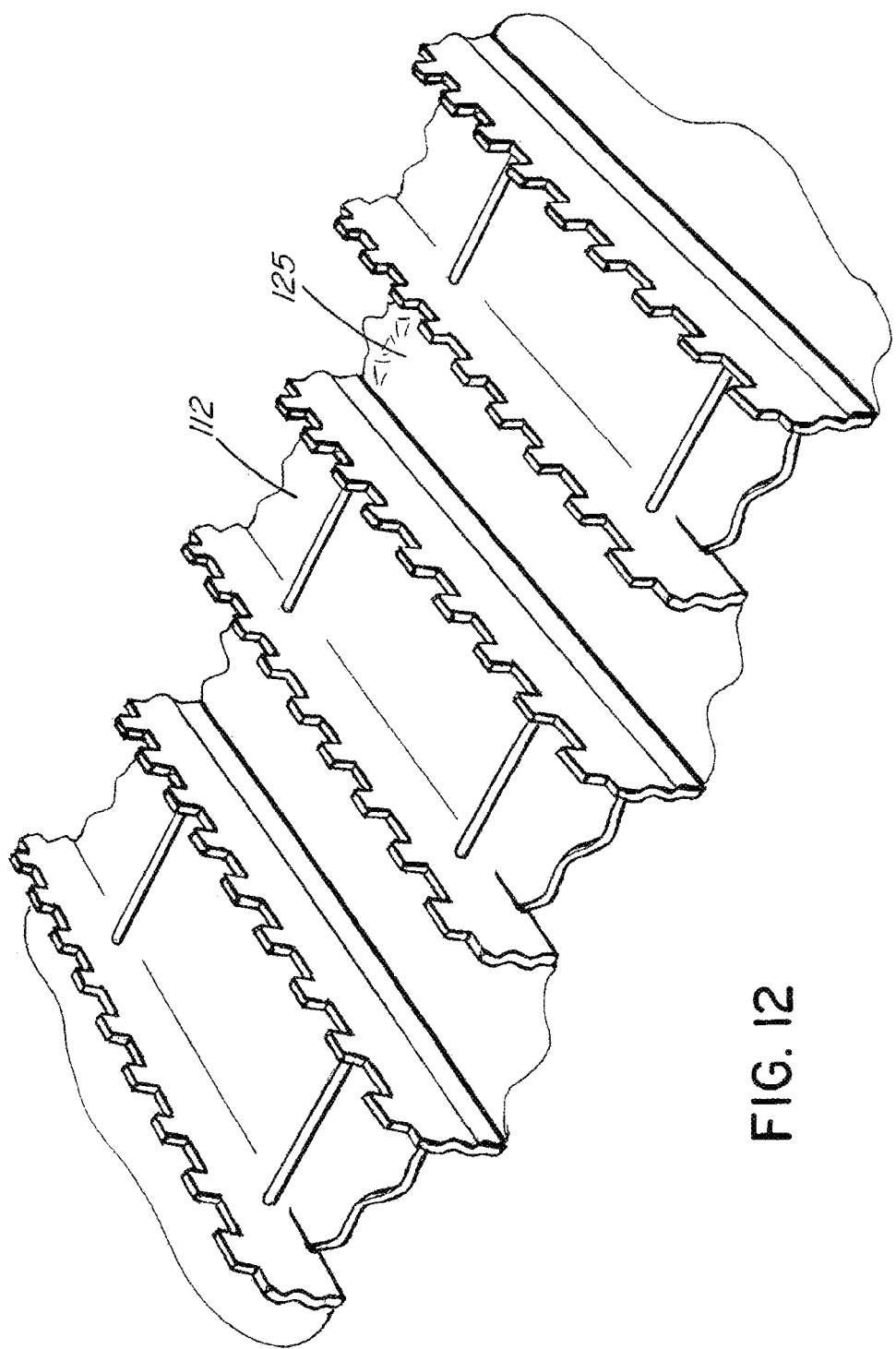
FIG. 12 is an isometric enlarged view of the overflow water troughs positioned above the tube settler assembly and showing sediment deposition in various of the tubes of the tube settler assembly.
Figure 13:
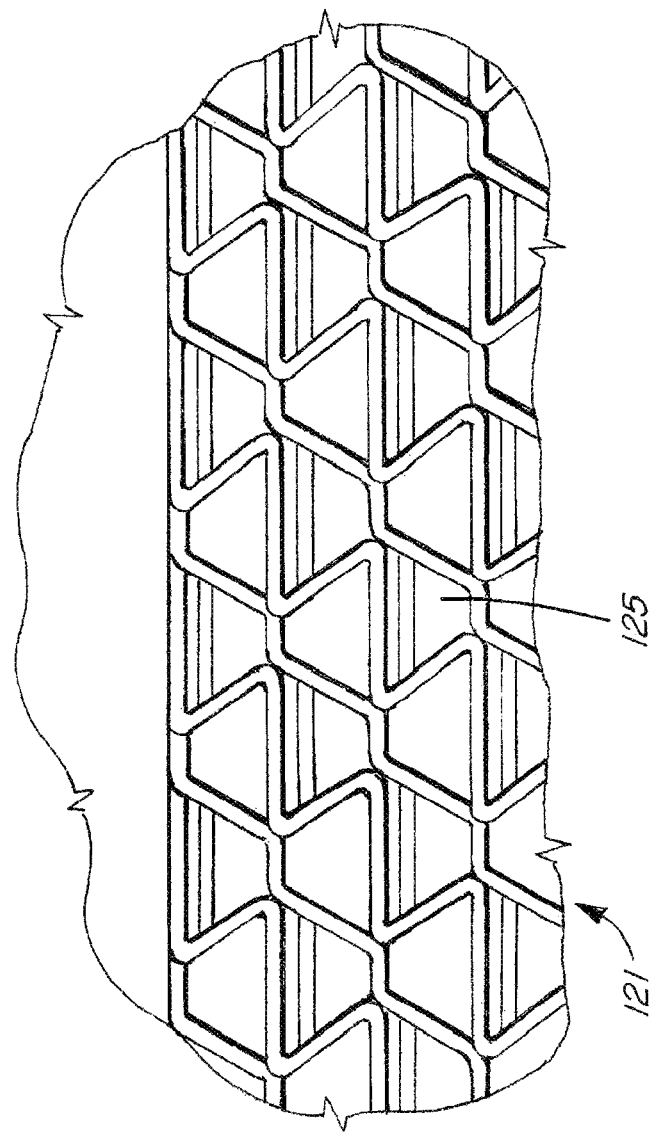
FIG. 13 is an enlarged isometric partial plan view of the tube settler assembly illustrating sediment deposition within various tubes of the tube settler assembly.

Referring to FIG. 1B, the tube settlement basin 204 carries the tube settler assembly generally illustrated at 121 (shown more clearly in FIGS. 12 and 13). The air supply assembly used to carry air and distribute the air to the tube settler assembly 121 is generally illustrated at 122.

The air supply assembly 122 includes a first and second air pipe 123, 124, respectively, as seen in FIG. 1B. Each of the air pipes 123, 124 extends the length of the tube settler assembly 121 and each terminates with a closed end to prevent the exit of air under pressure from the ends of the air pipes 123, 124. A plurality of tube laterals generally illustrated at 130, are connected to the first and second air pipe 123, 124. Each of the plurality of tube laterals 130 extend normal or perpendicular to the first and second air pipes 123, 124 and across substantially the entire area of the tube settler assembly 121. The plurality of tube laterals 130 emit air under pressure below the tube settler assembly 122 through the air discharge holes 211 (FIG. 10B) which are positioned so as to emit air upwardly or outwardly from the tube laterals 130 as required and are positioned such that the emitted air enters the bottom of the tube settler assembly 122 with some force which force of the emitted air and entrained liquid is intended to dislodge sediment within the tube settler assembly 122.

Figure 3:
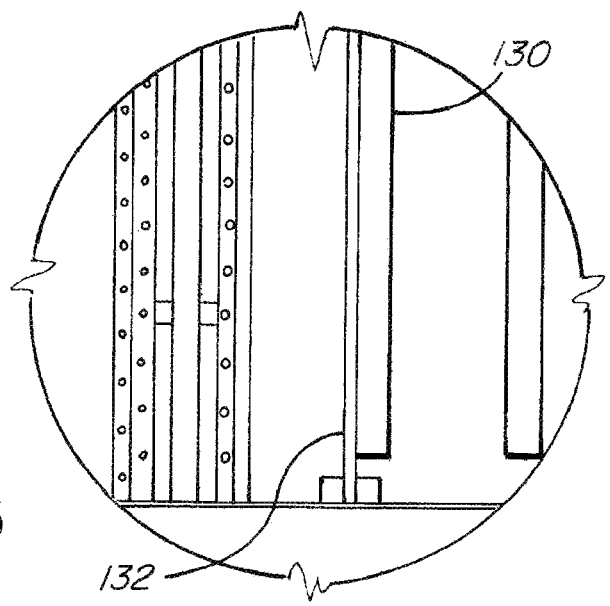
FIG. 3 is a diagrammatic enlarged plan view of the area III of FIG. 2.
Figure 4:
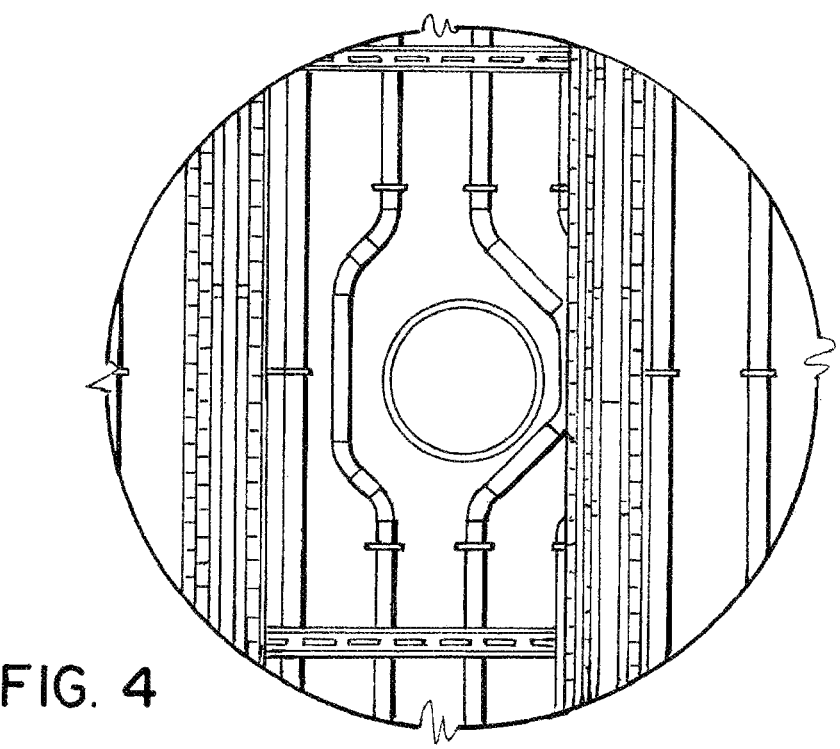
FIG. 4 is a diagrammatic enlarged plan view of the area IV of FIG. 2.
Figure 6A:
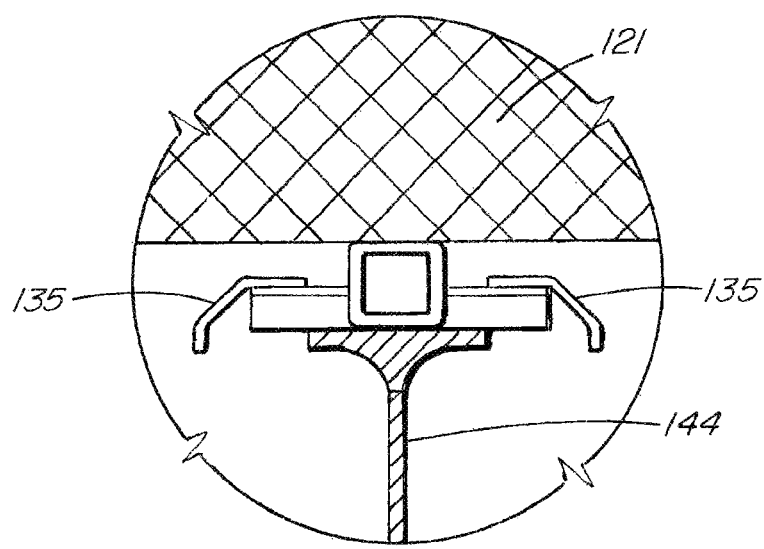
FIGS. 6A and 6B, respectively, are enlarged diagrammatic views of the areas VIA and VIB of FIG. 5.
Figure 6B:
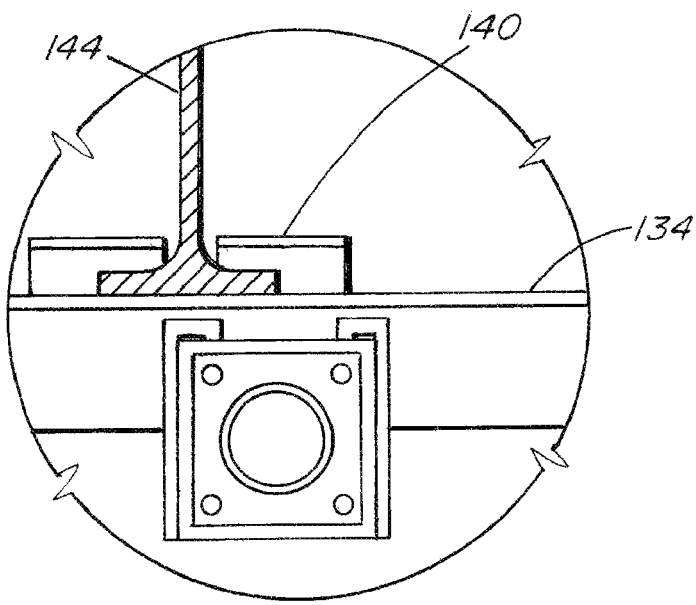
Figure 7:
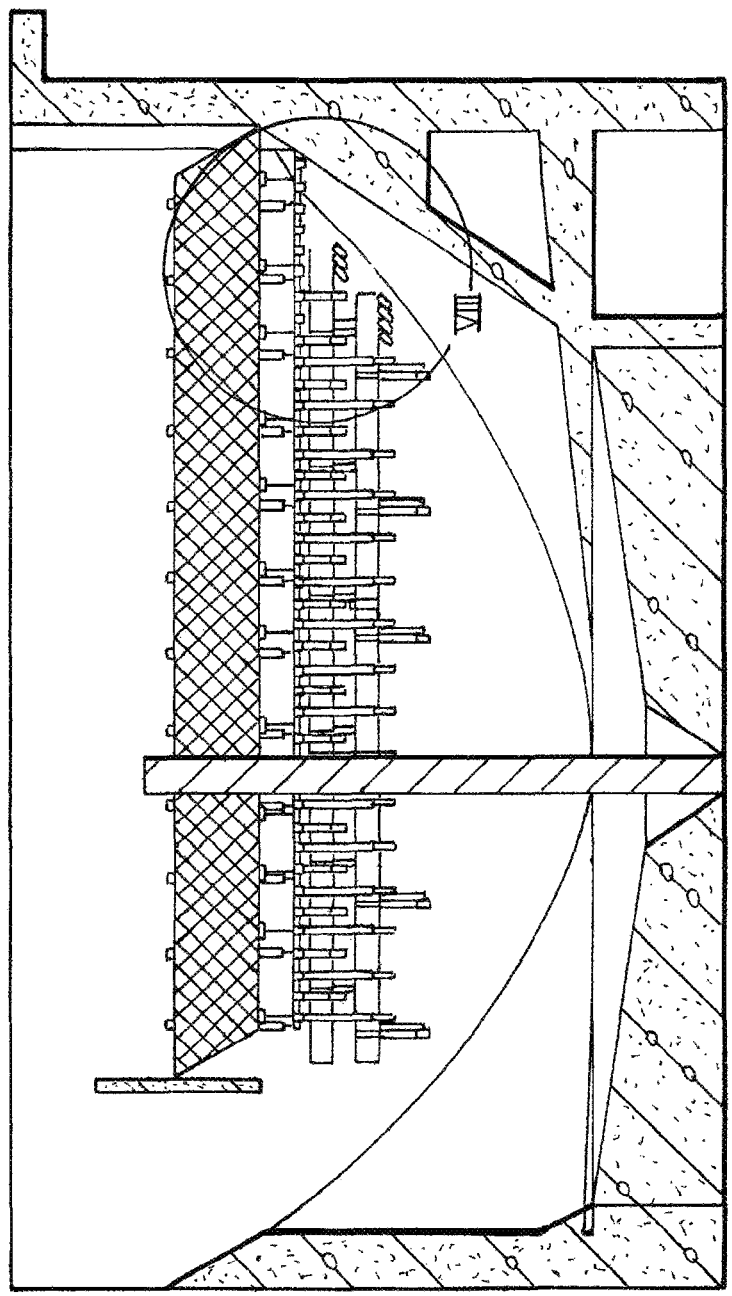
FIG. 7 is a partial sectional diagrammatic view of the section VII-VII of FIG. 2.
Figure 8:
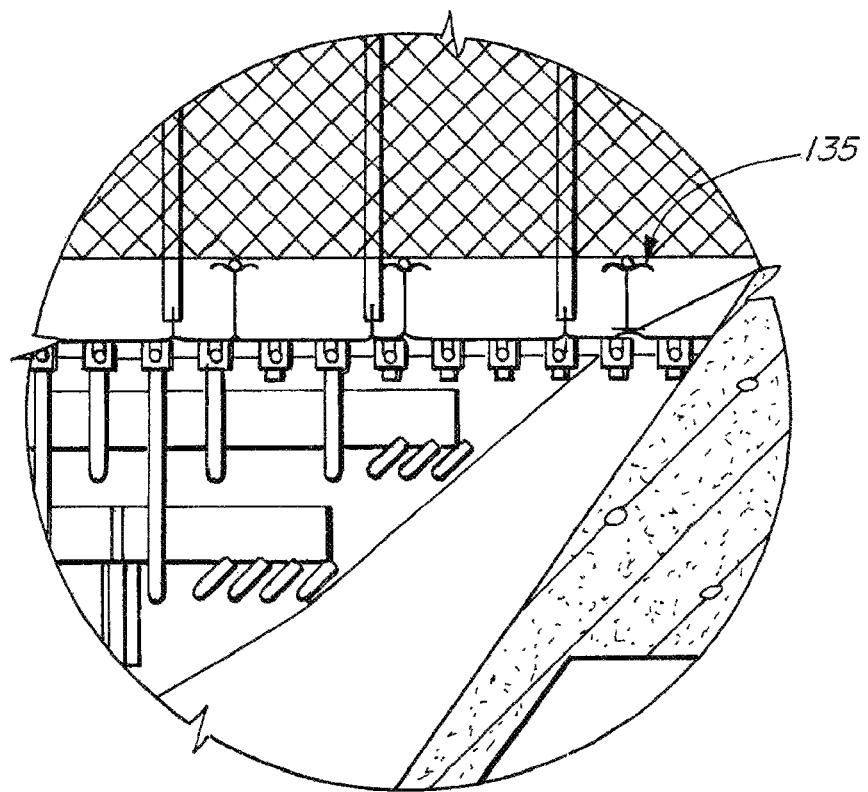
FIG. 8 is an enlarged view of the area VIII of FIG. 7.

Each of the tube laterals 130 is connected to a bar 132 (FIG. 3) which is connected to the concrete of the concrete clarifier cell 120. The bar 132 provides support for each of the tube laterals 130. An air deflector 135 is positioned over the tube laterals 130 as also seen in FIG. 6A. The air deflector assembly 135 may conveniently be perforated with a predetermined number of perforations (not illustrated). The air deflector 135, also seen in FIG. 6A, traps air beneath it and redistributes the air to the tubes within the tube settler assembly 122 which are located above the support structure or I-beams 144 which tubes of the tube settler assembly 135 would otherwise not be reachable by the emitted air leaving the tube laterals 130.

The tube settler assembly 122 is supported by a plurality of steel I-sections 144 (FIGS. 5 and 6A) which extend laterally across the bottom of the tube settler assembly 122 on the top of each I-section 144 and which are connected to support rails 134 (FIG. 6A) which extend normal to the tube laterals 130. Attachment clips 140 secure the I-sections 144 to the support rails 134.

Figure 10A:
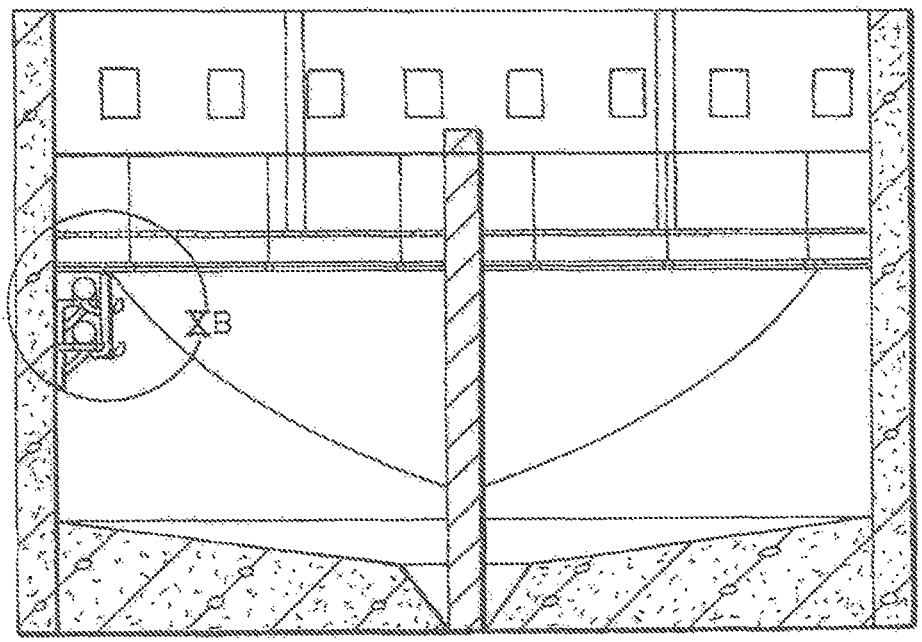
FIG. 10A is a diagrammatic partial sectional side view of the tube laterals extending across and beneath the tube settler assembly.
Figure 10B:
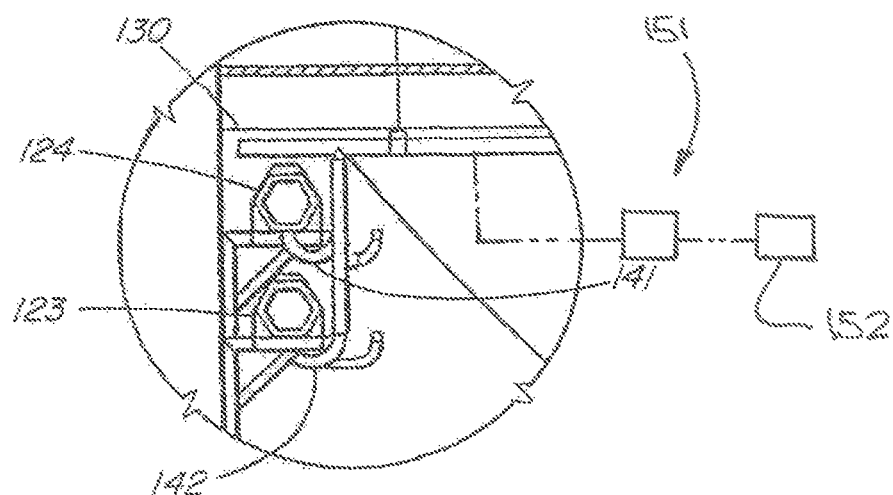
FIG. 10B is a diagrammatic enlarged partial side view of the tube laterals connected to the air pipes in the area XB of FIG. 10A.

Reference is made to FIGS. 10A and 10B wherein the first and second air pipes 123, 124 are illustrated as being connected to the tube laterals 130. Only one tube lateral 130 is shown but it will be appreciated that there is a series of tube laterals 130 located immediately behind tube lateral 130 extending the extent of the area of the tube settler assembly 121. Second air pipe 124 is connected through a manifold 141 which is also connected to tube laterals (not illustrated) directly behind tube lateral 130. First air pipe 123 is connected through a manifold 142 directly to tube laterals 130. Thus, the plurality of tube laterals 130 are connected alternatively to the air pipes 123, 124 across the bottom of the tube settler assembly 121 as is illustrated in FIG. 1B; that is, a first one of the air pipes 123, 124 is connected to a first one of the tube laterals 130 with the tube laterals 130 on either side of the first one of the tube laterals 130 being connected to the other of the air pipes 123, 124 as seen more clearly in FIG. 11. By using air generated by each of the air pipes 123, 124, air may be supplied only to one set of the tube laterals 130. Thereafter, air supplied by the other of the air pipes 123,124 is supplied to the second set of tube laterals 130 as also seen in FIG. 11. By the use of appropriate controls such as solenoids and interruption switches (not illustrated) which stop and release the supply of air from each of the air pipes 123, 124, independently and alternatively, air can be supplied to each of the tube laterals 130 which sets up a rhythmic air supply bearing on the bottom of the tube settler assembly 121 which is found to be beneficial for the dislodgement of sediment and debris within the tubes 125 of the tube settler assembly 121 as will be explained in greater detail.

The tube settler assembly 121 with the above located water troughs 112, generally made from a fiberglass composition, is shown in FIG. 12. As the water proceeds to move upwardly within the tubes 125 of the tube settler assembly 121, the individual tubes 125 will also act as a depository of sediment and other debris over time as seen in FIGS. 12 and 13. This sediment will, over time, settle within the tubes 125 of the tube settler assembly 121 and will degrade the water clarification process so it is desirable to remove this sediment in accordance with the invention described. Following the sediment removal within the tubes 125 of the tube settler assembly 121, the water will then pass to a filtration station generally illustrated 100 in FIG. 14 and will also pass to an ozone or chlorination treatment (not illustrated) before being considered satisfactory for potable uses.

The water filtration step 100 takes place in a concrete open top tank or basin generally illustrated at 100 which basin is defined by a bottom slab 102, side walls 103 and end walls 104. A partition 110, parallel to side wall 103, define an overflow trough or gullet 111 for receiving backwash water from semicylindrical metal, concrete or fibreglass troughs 112 (see also FIG. 12) which extend transversely of the basin 101 above the bed or basin 113 and carry the water leaving the tube settler assembly 121. The troughs 112 distribute the incoming water into the basin 113 for filtration according to the teachings of our U.S. Pat. No. 6,797,166, the contents of which are incorporated by reference herein.

Operation

With reference initially to FIG. 1A, raw water is admitted to the coagulation basin 201 through flume 210. A coagulant is added to destabilise the suspended solids and the water passes to the injection basin 202. Polymer and micro-sand are added in the injection basin 202 to the incoming water. The floc is fixed to the micro-sand with the polymer in a flocculation or maturation basin 203 where it acquires weight and volume. The flocculated water then passes from the maturation basin 203 to the lamella clarifier 204 as is illustrated in FIG. 1A.

Figure 9:
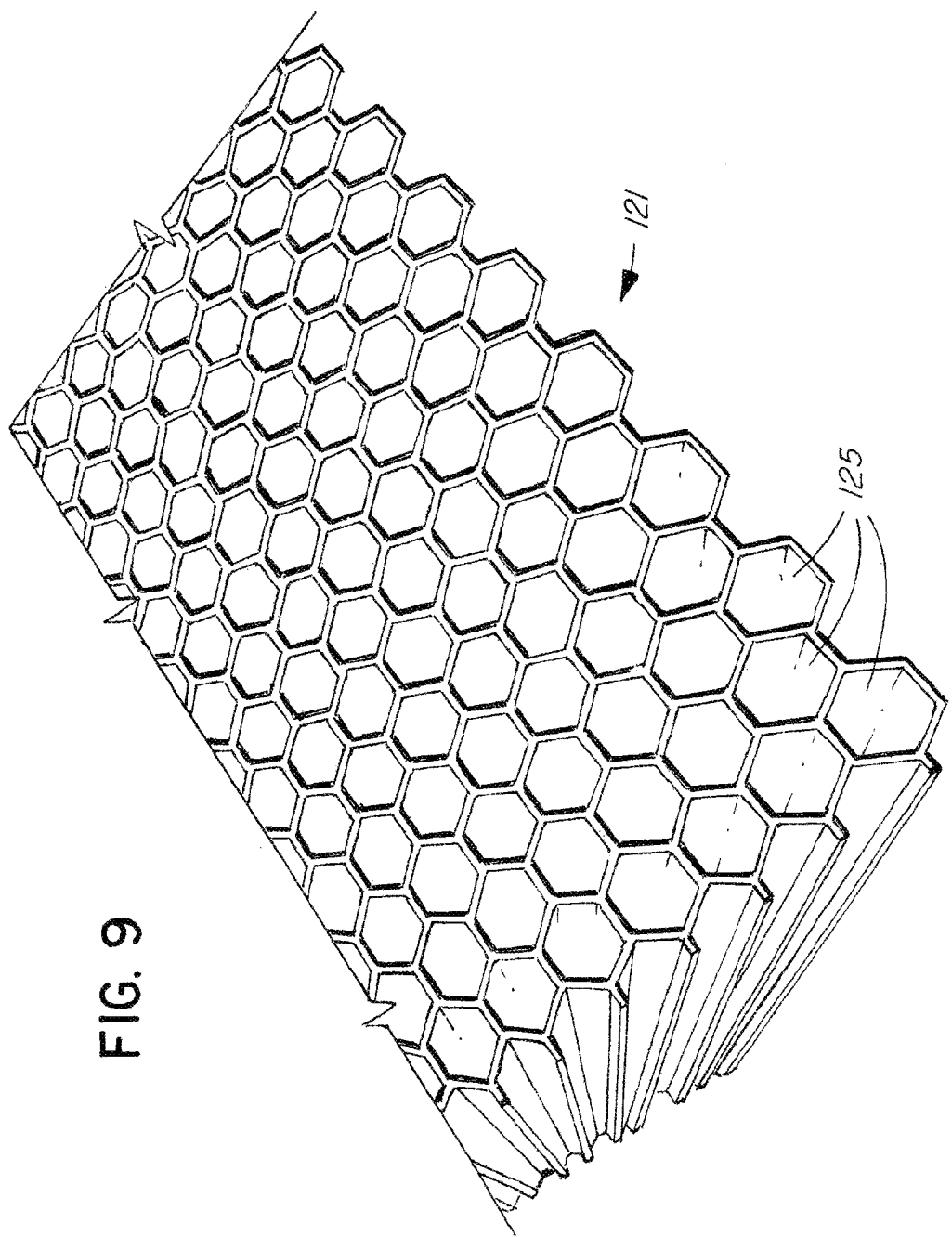
FIG. 9 is a diagrammatic isometric view of a typical tube settler assembly used in accordance with the invention.

As the flocculated water moves upwardly through the tube settler assembly 121 as viewed in FIG. 1B, sludge and sediment settles within and without the individual tubes 125 as seen in FIGS. 9, 12 and 13, of the tube settler assembly 121. The sludge and sediment settles into the bottom of the lamella clarifier 204 and is removed by way of a sludge pump 205 and a hydro cyclone 206 as in FIG. 1A, particularly in a high rate of clarification application although other techniques, including manual removal, may be used with a conventional clarifier.

The tube settler assembly 121 provides an increased effective settling area for the settable solids in the flocculated water. In addition to settling on the bottom of the lamella clarifier 204 as seen in FIG. 1A, the sediment will also be deposited in the individual tubes 125. In due course, the tubes 125 will become blocked or partially blocked with sediment which will degrade the sediment settling process significantly. When that occurs, the air and water dislodgement technique according to the invention is utilized to clean the tubes 125 of the tube settler assembly 121.

With reference to FIG. 1B, air under pressure is provided to each of the air pipes 123, 124, the air in each of the air pipes 123, 124 being under individual control. Each of the air pipes 123, 124 (FIGS. 10B and 11). The tube laterals 130 extend beneath substantially the entire area of the tube settler assembly 121 and have air discharge holes 211 (FIG. 10B) which allows the discharged air to be directed outwardly and upwardly into the tubes 125 of tube settler assembly 121. The air emitted by the holes 211 mixes with the water in the clarifier cell and will act to assist in the dislodgement of the sediment settled within the tubes of the tube settler assembly 121.

Two air pipes 123, 124 are referred to although more may be conveniently used if desired. First air pipe 123 provides air to the first set of tube laterals 130 and second air pipe 124 provides air to the second set of tube laterals 130. Thus and since the operation of each air pipe 123, 124 is independent of the other, the tube laterals 130 may be operated in a way best deemed necessary to dislodge the sediment and other debris and offers significant advantages in the cleaning operation of the tube settler assembly 121.

Air from one of the air pipes 124, 125 may be emitted from its connected tube laterals 130 at a pressure different from that of the other one of the air pipes 124, 125. Likewise, it may be desired to emit air from one set of the tube laterals 130 at a time different from the time of emission of the remaining set of the tube laterals 130. Or, if desired, the air can be emitted for a predetermined period from one set of tube laterals 130 and then shut off. The remaining set of tube laterals 130 can then emit air for a second predetermined period while the first set of tube laterals 130 is not emitting air.

Thus, the sediment dislodged from the tubes 125 in the tube settler assembly 121 may allow the dislodged sediment to move downwardly and through the adjacent tubes within the tube settler assembly 120 to the bottom of the lamella clarifier basin 120 where it can be removed as has been described with the settled sludge using the sludge pump 205 or manually as noted. In any event, the use of independent air supplies for the air pipes 123, 124 allows significant cleaning advantages over the prior art and allows more efficient water clarification within the lamella clarifier basin 120 without the necessity of extended downtime and the requirement for using significant manual labor for cleaning the tube settler assembly 121.

Following the clarifier step within the clarifier 204, the water passes through troughs 112 to the filtration step generally illustrated at 100 in FIG. 14. A concrete open tank or basin 101 is defined by bottom slab 102, side walls 103 and end walls 104, A partition 110, parallel to side wall 103, defines an overflow trough or gullet 111 for receiving backwash water from semicylindrical metal, concrete or fiber glass troughs 112 (see also FIG. 12) which extend transversely of the basin 101 above the bed 113 and carry the water leaving the clarifier phase 204 (FIG. 1A). The troughs 112 distribute the incoming water into the basin 113 for filtration.

Reference is now made to FIG. 6A where the air deflector or collector assembly 135 beneath the tube settler assembly 121 is illustrated as being attached to the support components or I-sections 144 supporting the tube settler assembly 121. The use of the air deflector or collector assembly 135 may be conveniently used if desired. The use of the air deflector or collector assembly 135 can create a turbulence condition between the released air and the water to assist the entrainment process of air mixed with the water and may assist in settlement dislodgement within the tubes 125 of the tube settler assembly 121. The air deflector 135 is perforated with openings made of a predetermined size. The deflector 135 is intended to release and/or direct air upwardly into those tubes of the tube settler assembly 121 which may usually be blocked or otherwise not readily accessible to the air released by the tube laterals 130 due to the position of the I-sections 144 and other support structure for the tube settler assembly 121.

Many modifications may readily be contemplated by those skilled in the art to which the invention relates. For example, while only two air pipes 123, 124 have been described, increasing the number of independent air pipes 123, 124 and their respectively associated tube laterals 130 may provide additional tube settler cleaning efficiencies. And allowing the air pressure in one of the air pipes 123, 124 to be greater than the air pressure in the remaining one of the air pipes 123, 124 may similarly allow cleaning efficiencies of the tubes 125 of the tube settler assembly 121 to take place. Similarly, the use of a rotating tube lateral assembly 130 is contemplated to have additional advantages in cleaning the tubes of the tube settler assembly 121 and in this event, appropriate support structure 151 as diagrammatically illustrated in FIG. 10B such as a motor 152 and appropriate gearing and mechanics or, alternatively, the use of pressurized air itself without an electric motor would allow the tube laterals 130 to rotate beneath the tube settler assembly 121.

Many further modifications may readily be contemplated. The description set out above is particularly applicable to high rate clarification applications. However, in conventional clarification where the upstream or downstream processes herein described are not used, the teachings according to the invention may have considerable merit and are also applicable. The specific embodiments described, therefore, should be taken as illustrative of the invention only and not as limiting its scope as defined in accordance with the accompanying claims.

We claim:

1. A method to dislodge sediment retained within individual tubes of a tube settler assembly used for water clarification, said method comprising entraining air released below said tube settler assembly with liquid and allowing said entrained air and liquid to move upwardly into said tube settler assembly and to dislodge sediment within said tubes of said tube settler assembly, said air and liquid entrainment taking place with air released from at least two adjacent tube laterals, said tube laterals being supplied with by an air supply, said air supply supplying air to a first of said two respective tube laterals independently of supplying said air to a second of said two respective tube laterals.

2. A method as in claim 1 and further including an air deflector assembly beneath said tube settler assembly wherein said air deflector assembly traps and redistributes air received from said tube laterals to said tube settler assembly.

3. A method as in claim 1 and further comprising allowing said tube laterals to rotate beneath said tube settler assembly, said air being emitted by said tube laterals as said tube laterals rotate beneath said tube settler assembly.

4. Apparatus to remove sediment retained with tubes of a tube settler assembly in a water clarification process, said apparatus comprising a tube settler assembly having a bottom area and a plurality of tubes, a plurality of tube laterals extending across substantially the entire bottom area of said tube settler assembly, air holes to emit air from said tube laterals, an air supply to provide air to said tube laterals, at least one of said tube laterals allowing air to exit from said air exit holes at a time different from air exiting from said air exist holes in a second tube laterals.

5. Apparatus as in claim 4 and further comprising at, least one air deflector mounted over said tube laterals to accumulate air from said air holes and distribute said air into said tubes of said tube settler assembly.

6. Apparatus as in claim 5 and further comprising means to rotate said tube laterals beneath said tube settler assembly.

* * * * *